United States Patent
Lee et al.

(10) Patent No.: US 8,390,915 B2
(45) Date of Patent: Mar. 5, 2013

(54) PANEL INCLUDING THERMOCHROMIC LAYER AND ELECTRIC CONDUCTIVE LAYER

(75) Inventors: Mi-Hyun Lee, Yongin-si (KR); Myun-Gi Shim, Yongin-si (KR); Soo-Ho Park, Yongin-si (KR); Dong-Gun Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/848,933

(22) Filed: Aug. 2, 2010

(65) Prior Publication Data
US 2011/0122478 A1 May 26, 2011

(30) Foreign Application Priority Data
Nov. 20, 2009 (KR) .................. 10-2009-0112806

(51) Int. Cl.
*G02F 1/01* (2006.01)
(52) U.S. Cl. ............................................. 359/288
(58) Field of Classification Search ........... 359/288, 359/245, 248, 254, 290–292; 349/20, 86, 349/182
See application file for complete search history.

(56) References Cited

U.S. PATENT DOCUMENTS

| 3,829,692 | A | * | 8/1974 | Andrychuk | ............... | 250/330 |
| 5,786,838 | A | * | 7/1998 | Steinhauser et al. | .......... | 347/179 |
| 6,872,453 | B2 | | 3/2005 | Arnaud et al. | | |
| 7,316,422 | B1 | * | 1/2008 | Schmitz | ........................ | 283/91 |
| 7,362,663 | B2 | * | 4/2008 | Kagan | .......................... | 368/327 |
| 7,576,495 | B2 | * | 8/2009 | Hong et al. | ............... | 315/169.1 |
| 7,632,554 | B2 | * | 12/2009 | Kim et al. | ........................ | 428/29 |
| 7,781,047 | B2 | * | 8/2010 | Majumdar et al. | ......... | 428/195.1 |
| 2004/0005472 | A1 | | 1/2004 | Arnaud et al. | | |
| 2007/0179239 | A1 | * | 8/2007 | Li | .................................. | 524/497 |

FOREIGN PATENT DOCUMENTS

| DE | 10 2006 049 633 A1 | 4/2008 |
| JP | 2002-086606 A | 3/2002 |
| JP | 3315187 B2 | 6/2002 |
| JP | 3483544 B2 | 10/2003 |
| JP | 2008-094642 | 4/2008 |
| JP | 2009-093126 | 4/2009 |
| KR | 10-2002-0033579 A | 5/2002 |
| KR | 10-2009-0031045 | 3/2009 |

OTHER PUBLICATIONS

Office Action of Korean Patent Application No. 10-2009-0112806; dated Jun. 20, 2011; 4 pages, which corresponds with the subject U.S. Appl. No. 12/848,933.
European Search Report dated May 2, 2011, for corresponding European Patent application 10251965.9.
Patent Abstracts of Japan for Publication No. 06-281970; Publication Date: Oct. 7, 1994; in the name of Nishikitani, et al.
Patent Abstracts of Japan for Publication No. 2002-243555; Publication Date: Aug. 28, 2002; in the name of Tsuchiya.
Office Action of Korean Patent Application No. 10-2009-0112806 dated Feb. 21, 2012; 5 pages.

* cited by examiner

*Primary Examiner* — Tuyen Tra
(74) *Attorney, Agent, or Firm* — Christie, Parker & Hale, LLP

(57) ABSTRACT

A panel including a substrate coated with a thermochromic layer, and a plurality of electric conductive layers formed of an electric conductive material. Here, the infrared ray transmittance of the panel is randomly or desirably adjusted as an electric conductive layer generates heat, and the color tone of the panel may be adjusted as desired by a user.

14 Claims, 4 Drawing Sheets

PANEL INCLUDING THERMOCHROMIC LAYER AND ELECTRIC CONDUCTIVE LAYER

CROSS-REFERENCE TO RELATED APPLICATION

This application claims the benefit of Korean Patent Application No. 10-2009-0112806, filed Nov. 20, 2009, in the Korean Intellectual Property Office, the entire content of which is incorporated herein by reference.

BACKGROUND

1. Field

One or more embodiments of the present invention relate to a panel including a thermochromic layer, and to a panel including a thermochromic layer and an electric conductive layer.

2. Description of Related Art

With the rapid increase of the cost of chemical energy sources such as petroleum, demand for development of a new energy source is increasing. However, it is also important to control energy consumption. In a typical household, 60% or more of energy is consumed in heating and cooling. In particular, about 24% of the consumed energy escapes through windows of typical houses and buildings.

Various efforts have been made to reduce the amount of energy lost through windows. For example, the size of windows may be controlled, or a high insulation window may be installed.

An example of a high insulation window is a panel including a glass coated with a thermochromic layer for adjusting energy inflow by adjustment of infrared ray transmittance.

SUMMARY

One or more aspects of the embodiments of the present invention are directed toward a panel including a thermochromic layer and an electric conductive layer, wherein color tone of the glass coated on the thermochromic layer is corrected by the electric conductive layer.

Additional aspects of the present invention will be set forth, in part, in the following description and, in part, will be apparent from the description, or may be learned by practice of the presented embodiments.

According to one or more embodiments of the present invention, a panel is provided to include a substrate coated with a thermochromic layer; and a plurality of electric conductive layers including an electric conductive material. In one embodiment, the electric conductive layer includes a first layer composed of an electric conductive material and for controlling a color tone of the panel; and a second layer composed of an electric conductive material and for generating heat.

In one embodiment, the second layer is between the first layer and the substrate coated with the thermochromic layer.

In one embodiment, the first layer adjusts the color tone of the panel through constructive interference by adjusting a thickness of the first layer.

In one embodiment, the first layer and the second layer are composed of a material selected from the group consisting of porous carbons, conductive polymers, metals, metal oxides, metal nitrides, and combinations thereof.

In one embodiment, the first layer and the second layer include a material selected from the group consisting of polyacetylene, polyaniline, polypyrrole, polythiophene, polysulfur nitride, polyphenylenevinylene, polyacene, or combinations thereof.

In one embodiment, the first layer and the second layer include a material selected from group consisting of silver (Ag), gold (Au), copper (Cu), aluminum (Al), platinum (Pt), nickel (Ni), lead (Pb), cobalt (Co), rhodium (Rh), ruthenium (Ru), tin (Sn), iridium (Ir), palladium (Pd), zinc (Zn), zirconium (Zr), niobium (Nb), vanadium (V), chrome (Cr), molybdenum (Mo), tungsten (W), titanium (Ti), oxides thereof, nitrides thereof, or combinations thereof.

In one embodiment, the first layer and the second layer are composed of a material selected from the group consisting of graphite, carbon nanotube (CNT), charcoal, and combinations thereof.

In one embodiment, the second layer is electrically connected to an external power supply, and the second layer receives power from the external power supply and generates heat.

In one embodiment, the first layer and the second layer have a mesh shape.

The first layer and the second layer having a mesh shape are arranged such that an aperture ratio of the panel is of about 20% to about 95%.

In one embodiment, the first layer and the second layer have a stripe shape.

In one embodiment, the first layer and second layer having a stripe shape are arranged such that an aperture ratio of the panel is of about 20% to about 95%.

In one embodiment, the thermochromic layer is composed of vanadium oxide.

In one embodiment, the first layer has a thickness satisfying the equation:

$$d = \frac{n\lambda}{2\sin\Theta}$$

wherein:
d is the thickness of the first layer; θ is an angle of incidence of light;
n is an integer;
λ is a wavelength of incident light; and wherein 2d sin θ is an integer multiple of the wavelength of the incident light.

In one embodiment, the thermochromic layer includes vanadium oxide.

In one embodiment, the thermochromic layer is between the substrate and the plurality of electric conductive layers.

In one embodiment, the plurality of electric conductive layers are between the substrate and the thermochromic layer.

In one embodiment, the substrate is between the thermochromic layer and the plurality of electric conductive layers.

According to one or more embodiments, a panel is provided to include a substrate stacked with a thermochromic layer and an electric conductive layer, the electric conductive layer having a first layer composed of a first conductive material, and a second layer composed of a second conductive material.

In one embodiment, the first conductive material is in the first layer to control a color tone of the panel, and the second conductive material is in the second layer to generate heat.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
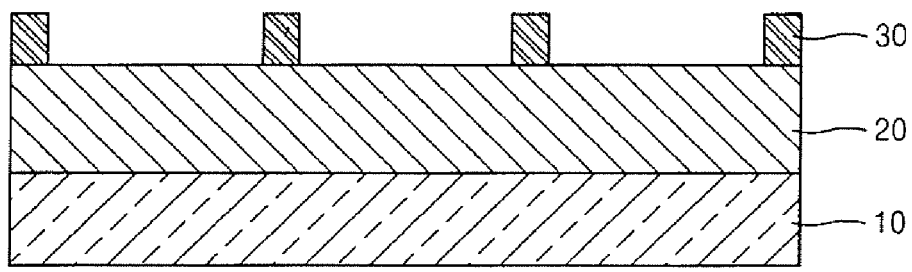
FIGS. 1, 2, and 3 are sectional diagrams of panels according to embodiments of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Referring to FIG. 1, each of panels 100a, 100b, and 100c according to an embodiment of the present invention includes a substrate 10, a thermochromic layer 20, and an electric conductive layer 30.

The substrate 10 is a glass panel that may be used as a window pane, but is not limited thereto as long as the substrate 10 is flat and transparent. Accordingly, the raw material, the thickness, the size, and the shape of the substrate 10 may vary.

A transparent substrate may be used instead of the glass panel as the substrate 10. For example, an indium tin oxide (ITO) panel, a substrate formed by depositing coloring materials (NiO, $Cr_2O_3$, or CoO) onto an ITO panel, a polymer film, such as a polyester film, a polysulfone film, a polycarbonate film, a polyamide film, a polystyrene film, a polymethylpentane film, a polyethylene-terephthalate film, or a polyvinyl chloride, or a substrate formed by depositing coloring materials onto a polymer film may be used as the substrate 10. Furthermore, suitable surface processing may be performed on the substrate 10, so that a thermochromic layer or an electric conductive layer is easily stacked thereon.

In the thermochromic layer 20, metal insulator transition (MIT) occurs at a particular temperature. Here, the particular temperature refers to a phase transition temperature. In other words, when the temperature of the thermochromic layer 20 is higher than the phase transition temperature of the thermochromic layer 20, the thermochromic layer 20 blocks or reflects infrared rays. When the temperature of the thermochromic layer 20 is lower than the phase transition temperature of the thermochromic layer 20, the thermochromic layer 20 transmits infrared rays.

The thermochromic layer 20 may be formed of vanadium oxide ($V_xO_y$). For example, the thermochromic layer 20 may contain vanadium dioxide VxOy (x:y=1:2), vanadium oxide $VO_x$ (x<2), or vanadium pentaoxide $V_xO_y$ (x:y=2:5). The thermochromic layer 20 may contain vanadium oxide $VO_x$ (x<2), because, while vanadium oxide exists as vanadium dioxide $V_xO_y$ (x:y=1:2) in a homogeneous structure, vanadium dioxide is relatively less oxidized in a heterogeneous structure and, in some cases, may include raw metal atoms of vanadium. Especially, it is known that the phase transition temperature of vanadium dioxide $VO_2$ is approximately 68° C. In other words, vanadium dioxide $VO_2$ may exhibit metal phase characteristics, and blocks or reflects infrared rays. Furthermore, vanadium dioxide $VO_2$ may exhibit semiconductor phase characteristics, and transmit infrared rays.

In addition to vanadium oxides, the thermochromic layer 20 may be formed of various other suitable materials, as long as the infrared ray transmittance of the material varies significantly around the phase transition temperature of the material. Furthermore, the thermochromic layer 20 may be formed of a plurality of vanadium oxide layers, or may be formed of a stacked layer including a vanadium oxide layer and a dielectric layer. Here, the dielectric layer may be formed of tantalum oxide ($Ta_2O_5$), zinc oxide (ZnO), tin oxide ($SnO_2$), niobium oxide ($Nb_2O_5$), titanium oxide (TiO), titanium dioxide ($TiO_2$), or a combination thereof.

The thermochromic layer 20 may be formed by using various methods, e.g., chemical vapor deposition (CVD), sputtering, or coating.

The electric conductive layer 30 is formed on the substrate 10 or the thermochromic layer 20 to have a mesh shape or a stripe shape.

The electric conductive layer 30 may be formed of a plurality of layers. The electric conductive layer 30 also functions as a heating layer and a color correcting layer for correcting color tone of a panel.

The electric conductive layer 30, which functions as a heating layer, changes the infrared ray transmittance of the thermochromic layer 20 by heating the electric conductive layer 30. In other words, when power is provided to the electric conductive layer 30 and heat is generated by the electric resistance of the electric conductive layer 30, the heat may be sufficiently transmitted to the thermochromic layer 20 so as to heat the thermochromic 20 to a temperature around the phase transition temperature of the thermochromic layer 20. Accordingly, transmittance and reflectivity of the thermochromic layer 20 are changed. Here, the electric conductive layer 30 may include a bus unit or a terminal unit, and the terminal unit may be connected to an external power supply, so that power may be provided thereto.

Furthermore, the electric conductive layer 30, which functions as a color correcting layer, corrects for a yellowish color of the thermochromic layer 20 due to vanadium oxide contained therein, so that the panels 100a, 100b, and 100c may exhibit an overall blue color, an overall greyish color or an overall greenish color.

The electric conductive layer 30 may be formed by using one or more suitable methods; e.g. chemical vapor deposition (CVD), sputtering, and/or coating.

The electric conductive layer 30 will be described in more detail below with reference to FIG. 4.

Figure 2:
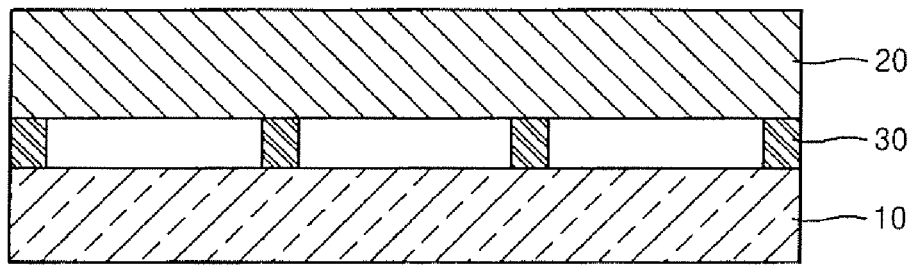
Figure 3:
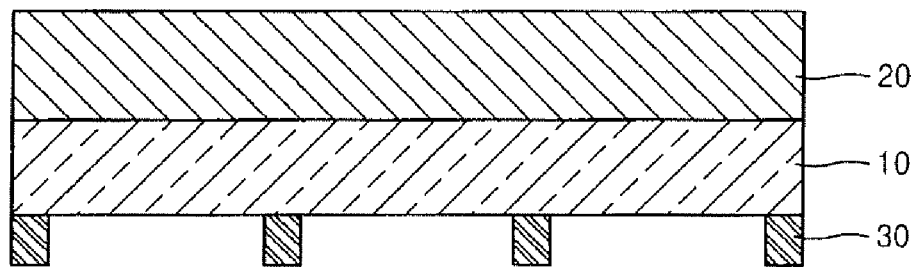

FIGS. 1, 2, and 3 are sectional diagrams of the panels 100a, 100b, and 100c according to embodiments of the present invention.

Referring to FIG. 1, according to an embodiment of the present invention, the panel 100a includes the thermochromic layer 20, which is coated on the substrate 10, and the electric conductive layer 30, which is coated on the thermochromic layer 20.

Referring to FIG. 2, in the panel 100b according to another embodiment of the present invention, the electric conductive layer 30 may be formed between the substrate 10 and the thermochromic layer 20.

Referring to FIG. 3, in the panel 100c according to another embodiment of the present invention, the substrate 10 and the thermochromic layer 20 may be stacked on the electric conductive layer 30.

However, the panels 100a, 100b, and 100c according to the present invention are not limited thereto. For example, although the electric conductive layer 30 is formed on a single surface of the thermochromic layer 20 or the substrate 10 in FIGS. 1, 2, and 3, the electric conductive layer 30 may also be formed on two (or both) surfaces of the substrate 10 and then coated with the thermochromic layer 20. Furthermore, in cases where a multi-layer glass panel including one or more glass panels is used, the electric conductive layer 30 may be formed on either a single surface or two (or both) surfaces of each of the one or more glass panels constituting the multi-layer glass panel.

Referring to FIGS. 1, 2, and 3, the electric conductive layer 30 is arranged to have a mesh shape or a stripe shape, and thus there may be empty spaces in the electric conductive layer 30. The empty spaces may either be filled with an insulation material or left empty.

Hereinafter, detailed descriptions of the electric conductive layer 30 of the panels 100a, 100b, and 100c according to embodiments of the present invention are provided in more detail herein.

Figure 4:
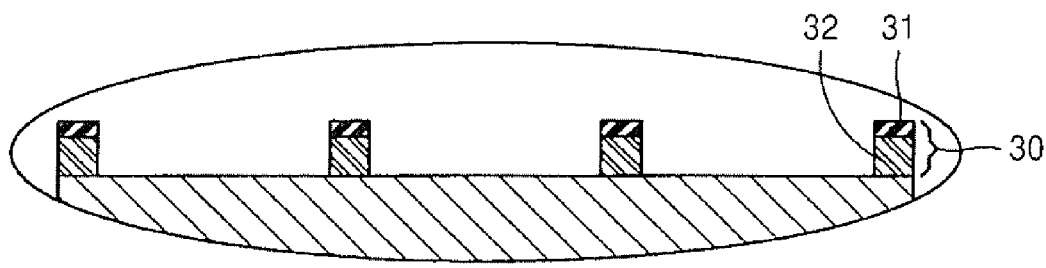
FIG. 4 is a diagram showing a structure of an electric conductive layer included in the panels shown in FIGS. 1, 2, and 3, respectively.

FIG. 4 is a diagram showing a structure of the electric conductive layer 30 included in the panels 100a, 100b, and 100c shown in FIGS. 1, 2, and 3, respectively.

Referring to FIG. 4, the electric conductive layer 30 may be formed of a plurality of layers. For example, the electric conductive layer 30 may include a first layer 31 and a second layer 32. The first layer 31 may be a layer for correcting color (tone) of the thermochromic layer 20, which exhibits a yellowish color, whereas the second layer 32 may be a thermal layer for generating heat. However, the structure of the electric conductive layer 30 is not limited to the structure including one first layer 31 and one second layer 32, and thus, a plurality of the first layer 31 and a plurality of the second layer 32 may be formed. Furthermore, the first layer 31 and the second layer 32 may be stacked in any order.

Both the first layer 31 and the second layer 32 included in the electric conductive layer 30 are formed of or include materials exhibiting electric conductivity. The first layer 31 and the second layer 32 may be formed of different materials. However, the present invention is not limited thereto, and the first layer 31 and the second layer 32 may be formed of the same material.

For example, the first layer 31 and the second layer 32 included in the electric conductive layer 30 may be formed of one or more materials selected from porous carbons, conductive polymers, metals, metal oxides, metal nitrides, or combinations thereof. Specifically, when a porous carbon is selected, the first layer 31 and/or the second layer 32 may be formed of one or more materials selected from graphite, carbon nanotube (CNT), charcoal, or combinations thereof. When a conductive polymer is selected, the first layer 31 and/or the second layer 32 may be formed of one or more materials selected from polyacetylene, polyaniline, polypyrrole, polythiophene, polysulfur nitride, polyphenylenevinylene, polyacene, or combinations thereof. When a metal, a metal oxide, or a metal nitride is selected, the first layer 31 and/or the second layer 32 may be formed of one or more materials selected from the group consisting of silver (Ag), gold (Au), copper (Cu), aluminium (Al), platinum (Pt), nickel (Ni), lead (Pb), cobalt (Co), rhodium (Rh), ruthenium (Ru), tin (Sn), iridium (Ir), palladium (Pd), zinc (Zn), zirconium (Zr), niobium (Nb), vanadium (V), chrome (Cr), molybdenum (Mo), tungsten (W), titanium (Ti), oxides thereof, nitrides thereof, and combinations thereof.

The material selected for the first layer 31 and the second layer 32 may exhibit electric conductivity, may be easily stacked on the thermochromic layer 20 or the substrate 10, and may be easily formed as a layer having a thickness of hundreds of nanometers, or a thickness in the nanometer range.

The second layer 32 may be formed of a material having relatively high electric resistance in order for the second layer 32 to generate a sufficient amount of heat. The infrared ray transmittance of the thermochromic layer 20 may be changed by heating the thermochromic layer 20 to a temperature around the phase transition temperature of vanadium dioxide via heat generation of the second layer 32.

Figure 5:
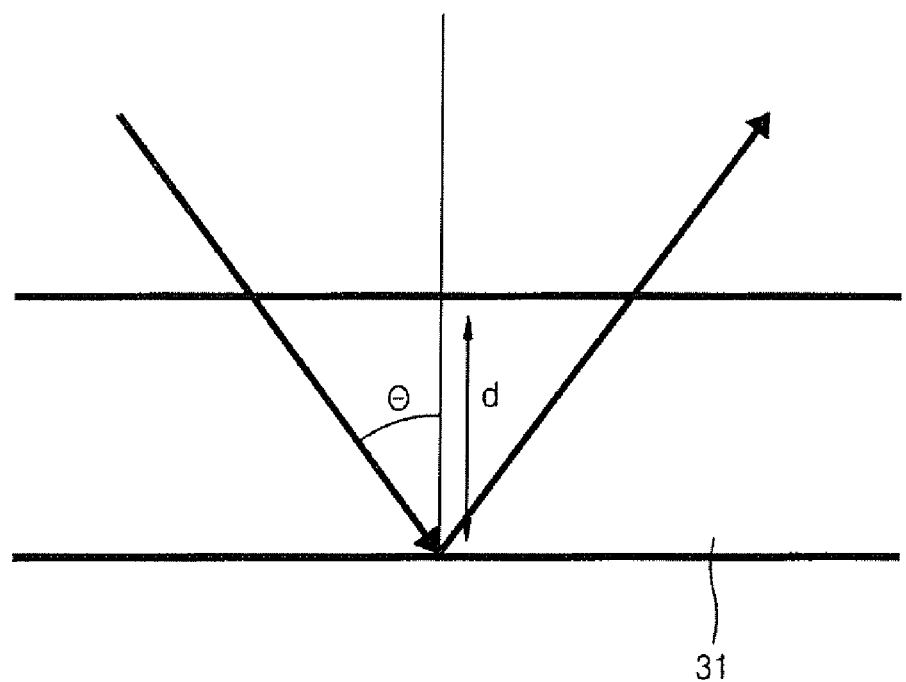
FIG. 5 is a diagram showing the principle of the electric conductive layer controlling color tones of the panels.

FIG. 5 is a diagram showing the principle of the electric conductive layer 30 controlling color tones of the panels 100a, 100b, and 100c.

Referring to FIG. 5, the first layer 31 for controlling color tones is described below in more detail.

As shown in Equation 1 below, the first layer 31 functions as a color correcting layer, wherein by adjusting the thickness of the first layer 31, constructive interference occurs, so as to obtain visible rays in a desired wavelength range.

$$2d \sin \theta = n\lambda \qquad \text{Equation 1}$$

Here, d is the thickness of the first layer 3; θ is an angle of incidence of light; n is an integer (that e.g., can be any integer); and λ is a wavelength of incident light. Accordingly, $d = n\lambda/2 \sin \theta$.

In Equation 1, constructive interference occurs when 2d sin θ of Equation 1 is an integer multiple of the wavelength of the incident light (λ, 2λ, 3λ, and so on), whereas destructive interference occurs when 2d sin θ of Equation 1 is half of the wavelength or an odd integer multiple of half the wavelength (n+1/2)λ (λ/2, 3λ/2, and so on).

According to Equation 1, thicknesses of the first layer 31 at which constructive interference occurs in a desired wavelength range may be calculated. For example, it is assumed that wavelengths from 380 nm to 400 nm are the range of wavelengths in which constructive interference is desired. In this case, when n is 1, the thickness of the first layer 31 may be about 380 nm to about 400 nm in order for constructive interference to occur in the range of wavelengths from about 380 nm to about 400 nm. Furthermore, when n is 2, the thickness of the first layer 31 may be within about 760 nm to about 800 nm in order for constructive interference to occur in the range of wavelengths from about 380 nm to about 400 nm. In other words, constructive interference occurs when n is an integer within a range of wavelengths in which constructive interference is desired. Here, the thickness of the first layer 31 may be from about hundreds of nanometers to dozens of micrometers. In one embodiment, the thickness is between nanometer and micrometer range.

According to embodiments of the present invention, a color corresponding to the range of wavelengths in which constructive interference is desired may be a bluish color, which may correct a yellowish color and is preferred by consumers. Therefore, in this case, constructive interference should occur in the range of wavelengths from about 450 nm to about 490 nm, which is the range of wavelengths for bluish colors. When n is 1, the thickness of the first layer 31 may be within about 450 nm to about 490 nm. When n is 2, the thickness of the first layer 31 may be within about 900 nm to about 980 nm. In one embodiment, the thickness of the first layer 31 is considered only for $1 \leq n \geq 100$, because installation and processing of a panel as a window pane is difficult, if the panel is excessively thick due to the first layer 31.

According to an embodiment of the present invention, the first layer 31 may be formed by using a sputtering method, where the thickness of the first layer 31 may be controlled by adjusting deposition time during the sputtering method.

However, configurations for controlling color tones by using the first layer 31 are not limited to the adjustment of the thickness of the first layer 31 as described above. For example, the overall color tone of a panel may be controlled by forming fine holes in the electric conductive layer 30 and filling the fine holes with a pigment.

Accordingly, the first layer 31 in the electric conductive layer 30 may adjust the overall color tone of the panels 100a, 100b, and 100c by correcting a yellowish color exhibited by the thermochromic layer 20 due to vanadium oxide through constructive interference, so that the panels 100a, 100b, and 100c exhibit a bluish color, a grayish color, or a greenish color.

Figure 6A:
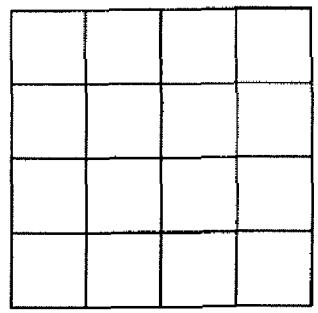
FIGS. 6A to 6C are diagrams showing arrangements of the electric conductive layer.
Figure 6B:
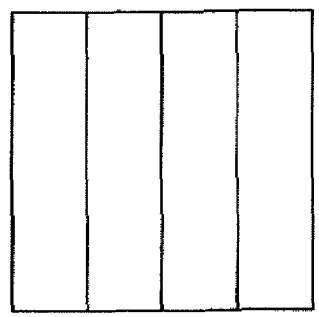
Figure 6C:
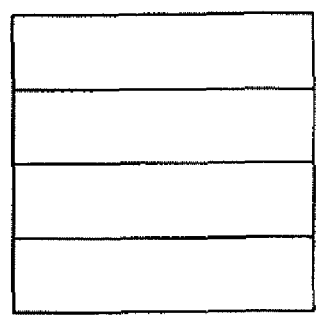

FIGS. 6A to 6C are diagrams showing arrangements of the electric conductive layer 30.

Referring to FIGS. 6A to 6C, the electric conductive layers 30 included in the panels 100a, 100b, and 100c according to embodiments of the present invention, may be arranged in a mesh shape as in FIG. 6A, or in a stripe shape as in FIGS. 6B and 6C. However, arrangements of the electric conductive layers 30 are not limited thereto, and the electric conductive layers 30 may be arranged in, or have any suitable shape, as long as the electric conductive layers 30 are evenly arranged and are evenly apart from each other on the thermochromic layer 20 or the substrate 10, and the aperture ratio of the panels 100a, 100b, and 100c due to the electric conductive layers 30 is from about 20% to about 95%.

If the aperture ratio of the panels 100a, 100b, and 100c is below 20%, the panels 100a, 100b, and 100c are not suitable to be used as window glasses. If the aperture ratio of the panels 100a, 100b, and 100c is above 95%, the intervals between electric conductive lines constituting the electric conductive layer 30 become too great, and thus it becomes difficult to evenly change temperatures of the panels 100a, 100b, and 100c. In other words, only the temperature of regions around the electric conductive lines constituting the electric conductive layer 30 increase, whereas in regions far from the regions around the electric conductive lines, the temperature thereof does not increase enough. Therefore, some regions maintain a temperature above the phase transition temperature of the thermochromic layer 20, whereas temperatures of the other regions are below the phase transition temperature of the thermochromic layer 20. As a result, it is difficult to evenly adjust overall transmittance of a window glass. Therefore, even transmittance throughout the panels 100a, 100b, and 100c may be embodied with the arrangement and the aperture ratio described above.

Figure 7:
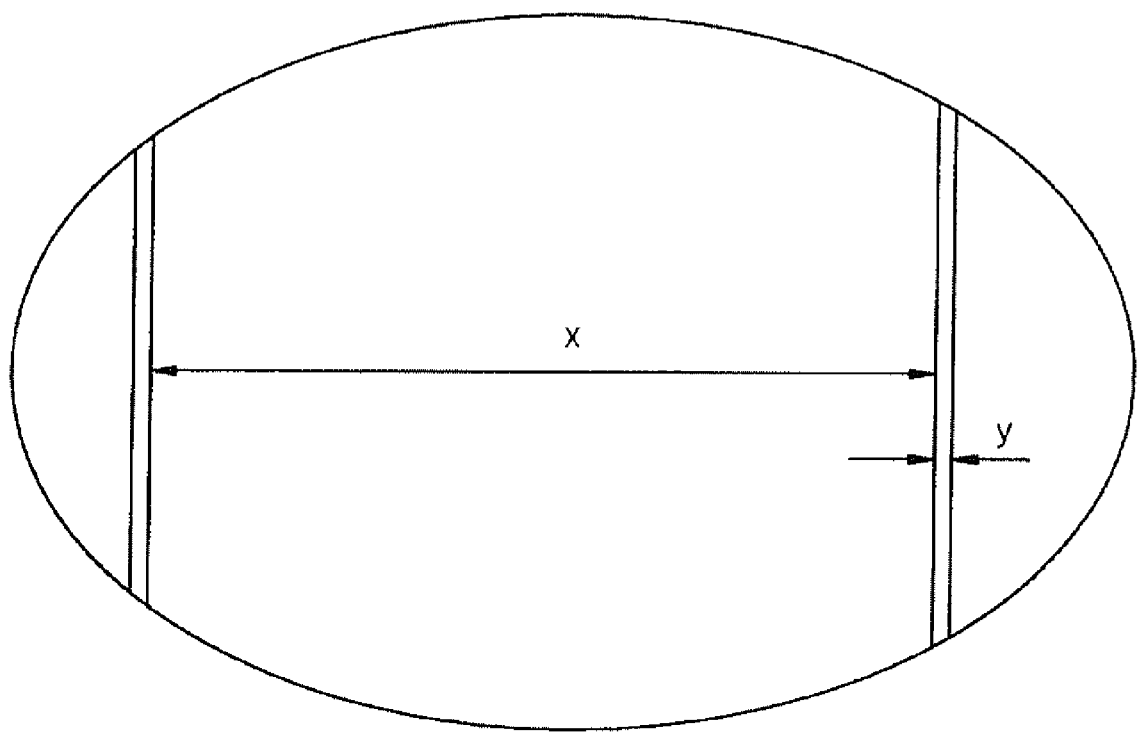
FIG. 7 is a diagram showing closer detail of a portion of the electric conductive layer shown in FIGS. 6A to 6C.

FIG. 7 is a diagram showing a portion of the electric conductive layer 30 shown in FIGS. 6A to 6C in closer detail.

Referring to FIG. 7, it is assumed that a width y of an electric conductive line is 10 μm according to an embodiment of the present invention. Here, the electric conductive lines are arranged in such a way that an interval x between the electric conductive lines is at least 400 mm. In this case, the aperture ratio is about 95%. However, the width of the electric conductive line and the intervals between the electric conductive lines are not limited thereto, and the width of the electric conductive line and the intervals between the electric conductive lines may have any suitable values so long as the aperture ratio is from about 20% to about 95%, and in one embodiment, from about 25% to about 90%.

The panels 100a, 100b, and 100c according to the present invention include the electric conductive layer 30 composed of a plurality of layers, and exhibits characteristics as described below.

Here, the electric conductive layer 30 may automatically adjust infrared ray transmittance. The infrared ray transmittance of the thermochromic layer 20 significantly varies around the phase transition temperature of the thermochromic layer 20, where the phase transition temperature of vanadium dioxide, which is generally used in the thermochromic layer 20, is a relatively high temperature. Furthermore, although the phase transition temperature of a thermochromic layer may be adjusted by ±30% by adding various elements to vanadium dioxide, the infrared ray transmittance (of the thermochromic layer) cannot be adjusted as desired by a user in the related art. In an embodiment of the present invention, the electric conductive layer 30 is included in the panels 100a, 100b, and 100c, so that the infrared ray transmittance of the panels 100a, 100b, and 100c may be adjusted as desired by a user. The electric conductive layers 30 have a suitable aperture ratio for the panels 100a, 100b, and 100c to be used as window glasses, and are evenly arranged such that the interval between the electric conductive layers is constant, so that the overall temperature of the thermochromic layer 20 is evenly adjusted.

An electric conductive layer according to an embodiment of the present invention also corrects a yellowish color exhibited by a thermochromic layer. A thermochromic layer containing vanadium dioxide exhibits a yellowish color due to the natural color of the vanadium dioxide. However, a bluish color, a grayish color, or a greenish color for window glasses may be preferred. Therefore, the thickness of the electric conductive layer may be adjusted in such a way that constructive interference occurs in a desired range of wavelengths. As a result, color correction is obtained by adjusting the thickness of the electric conductive layer without performing additional manufacturing processes, such as coating pigments on a glass or forming additional color correcting layers.

As described above, according to the one or more of the above embodiments of the present invention, the infrared ray transmittance of a panel may be randomly adjusted as an electric conductive layer generates heat.

As described above, according to the one or more of the above embodiments of the present invention, the color tone of a panel may be adjusted as desired.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A panel comprising:
    a substrate coated with a thermochromic layer having a color tone; and
    a plurality of electric conductive layers on the substrate comprising:
        a first layer comprising a first electric conductive material and for adjusting the color tone of the thermochromic layer; and
        a second layer comprising a second electric conductive material and for generating heat, wherein the first electric conductive material and the second electric conductive material are different from each other.

2. The panel of claim 1, wherein the first layer and the second layer comprise a material selected from the group consisting of porous carbons, conductive polymers, metals, metal oxides, metal nitrides, and combinations thereof.

3. The panel of claim 1, wherein the first layer and the second layer comprise a material selected from the group consisting of silver (Ag), gold (Au), copper (Cu), aluminium (Al), platinum (Pt), nickel (Ni), lead (Pb), cobalt (Co), rhodium (Rh), ruthenium (Ru), tin (Sn), iridium (Ir), palladium (Pd), zinc (Zn), zirconium (Zr), niobium (Nb), vanadium (V), chrome (Cr), molybdenum (Mo), tungsten (W), titanium (Ti), oxides thereof, nitrides thereof, and combinations thereof.

4. The panel of claim 1, wherein the first layer and the second layer have a mesh shape.

5. The panel of claim 1, wherein the first layer and the second layer have a stripe shape.

6. The panel of claim 1, wherein the thermochromic layer comprises vanadium oxide.

7. The panel of claim 1, wherein the thermochromic layer is between the substrate and the plurality of electric conductive layers.

8. The panel of claim 1, wherein the plurality of electric conductive layers are between the substrate and the thermochromic layer.

9. The panel of claim 1, wherein the substrate is between the thermochromic layer and the plurality of electric conductive layers.

10. A panel comprising:
a substrate coated with a thermochromic layer having a color tone; and
a plurality of electric conductive layers on the substrate comprising:
a first layer comprising a first electric conductive material and for adjusting the color tone of the thermochromic layer; and
a second layer comprising a second electric conductive material and for generating heat, wherein the first electric conductive material and the second electric conductive material are different from each other, and wherein the first layer and the second layer comprise a material selected from the group consisting of polyacetylene, polyaniline, polypyrrole, polythiophene, polysulfur nitride, polyphenylenevinylene, polyacene, and combinations thereof.

11. A panel comprising:
a substrate coated with a thermochromic layer having a color tone; and
a plurality of electric conductive layers on the substrate comprising:
a first layer comprising a first electric conductive material and for adjusting the color tone of the thermochromic layer; and
a second layer comprising a second electric conductive material and for generating heat, wherein the first layer and the second layer comprise a material selected from the group consisting of graphite, carbon nanotube (CNT), charcoal, and combinations thereof, and wherein the first electric conductive material and the second electric conductive material are different from each other.

12. A panel comprising:
a substrate coated with a thermochromic layer having a color tone; and
a plurality of electric conductive layers on the substrate comprising:
a first layer comprising a first electric conductive material and for adjusting the color tone of the thermochromic layer; and
a second layer comprising a second electric conductive material and for generating heat, wherein the second layer is electrically connected to an external power supply, and the second layer is configured to receive power from the external power supply and generates heat, and wherein the first electric conductive material and the second electric conductive material are different from each other.

13. A panel comprising:
a substrate coated with a thermochromic layer having a color tone; and
a plurality of electric conductive layers on the substrate comprising:
a first layer comprising a first electric conductive material and for adjusting the color tone of the thermochromic layer; and
a second layer comprising a second electric conductive material and for generating heat, wherein the first layer and the second layer are arranged such that an aperture ratio of the panel is of about 20% to about 95%, and wherein the first electric conductive material and the second electric conductive material are different from each other.

14. A panel comprising:
a substrate coated with a thermochromic layer having a color tone; and
a plurality of electric conductive layers on the substrate comprising:
a first layer comprising a first electric conductive material and for adjusting the color tone of the thermochromic layer; and
a second layer comprising a second electric conductive material and for generating heat, wherein the first layer has a thickness satisfying the equation:

$$d = \frac{n\lambda}{2\sin\Theta}$$

wherein:
d is the thickness of the first layer; $\theta$ is an angle of incidence of light;
n is an integer;
$\lambda$ is a wavelength of incident light; and wherein $2d \sin \theta$ is an integer multiple of the wavelength of the incident light.

* * * * *